(12) United States Patent
Carter

(10) Patent No.: US 9,198,403 B2
(45) Date of Patent: Dec. 1, 2015

(54) REMOVABLE WAVEMAKER

(71) Applicant: Richard W. Carter, Kaneohe, HI (US)

(72) Inventor: Richard W. Carter, Kaneohe, HI (US)

(*) Notice: Subject to any disclaimer, the term of this patent is extended or adjusted under 35 U.S.C. 154(b) by 0 days.

(21) Appl. No.: 14/447,561

(22) Filed: Jul. 30, 2014

(65) Prior Publication Data
US 2015/0037098 A1 Feb. 5, 2015

Related U.S. Application Data

(60) Provisional application No. 61/860,894, filed on Jul. 31, 2013.

(51) Int. Cl.
*A01K 63/00* (2006.01)
(52) U.S. Cl.
CPC .................................... *A01K 63/006* (2013.01)
(58) Field of Classification Search
CPC ...................................................... A01K 63/006
See application file for complete search history.

(56) References Cited

U.S. PATENT DOCUMENTS

| | | | |
|---|---|---|---|
| 2,663,092 A | 12/1953 | Laurent | |
| 3,292,579 A * | 12/1966 | Buchanan | 119/245 |
| 3,973,405 A | 8/1976 | Duport | |
| 4,062,192 A | 12/1977 | Biewer | |
| 4,290,153 A * | 9/1981 | Kockerols et al. | 4/491 |
| 4,406,162 A | 9/1983 | Hark | |
| 4,467,483 A | 8/1984 | Bastenhof | |
| 4,507,018 A | 3/1985 | Andersen | |
| 4,705,428 A | 11/1987 | Andersen | |
| 4,812,077 A | 3/1989 | Raike | |
| 4,976,570 A | 12/1990 | Davis | |
| 5,226,747 A * | 7/1993 | Wang et al. | 405/79 |
| 5,782,204 A | 7/1998 | Rahn | |
| 2009/0038067 A1 | 2/2009 | Johnson | |

\* cited by examiner

*Primary Examiner* — Tara M. Pinnock
(74) *Attorney, Agent, or Firm* — Leighton K. Chong

(57) ABSTRACT

A removable wavemaker having a self-supporting structure for use in a wave tank has an integrated mounting structure for mounting on a frame of an open top of the wave tank, a linear motor positioned above a waterline in the wave tank having a forcer containing activation coils that is driven in reciprocation motion by electromagnetic interaction with an array of permanent magnets contained in a tubular support structure on which the forcer is configured to slide, and a vertically-oriented wave board mounted on a lower part of the integrated mounting structure below the waterline for generating waves within the wave tank. The forcer is supported on a movable carriage that rides on a rail fixed to the integrated mounting structure and is coupled to the wave board.

20 Claims, 5 Drawing Sheets

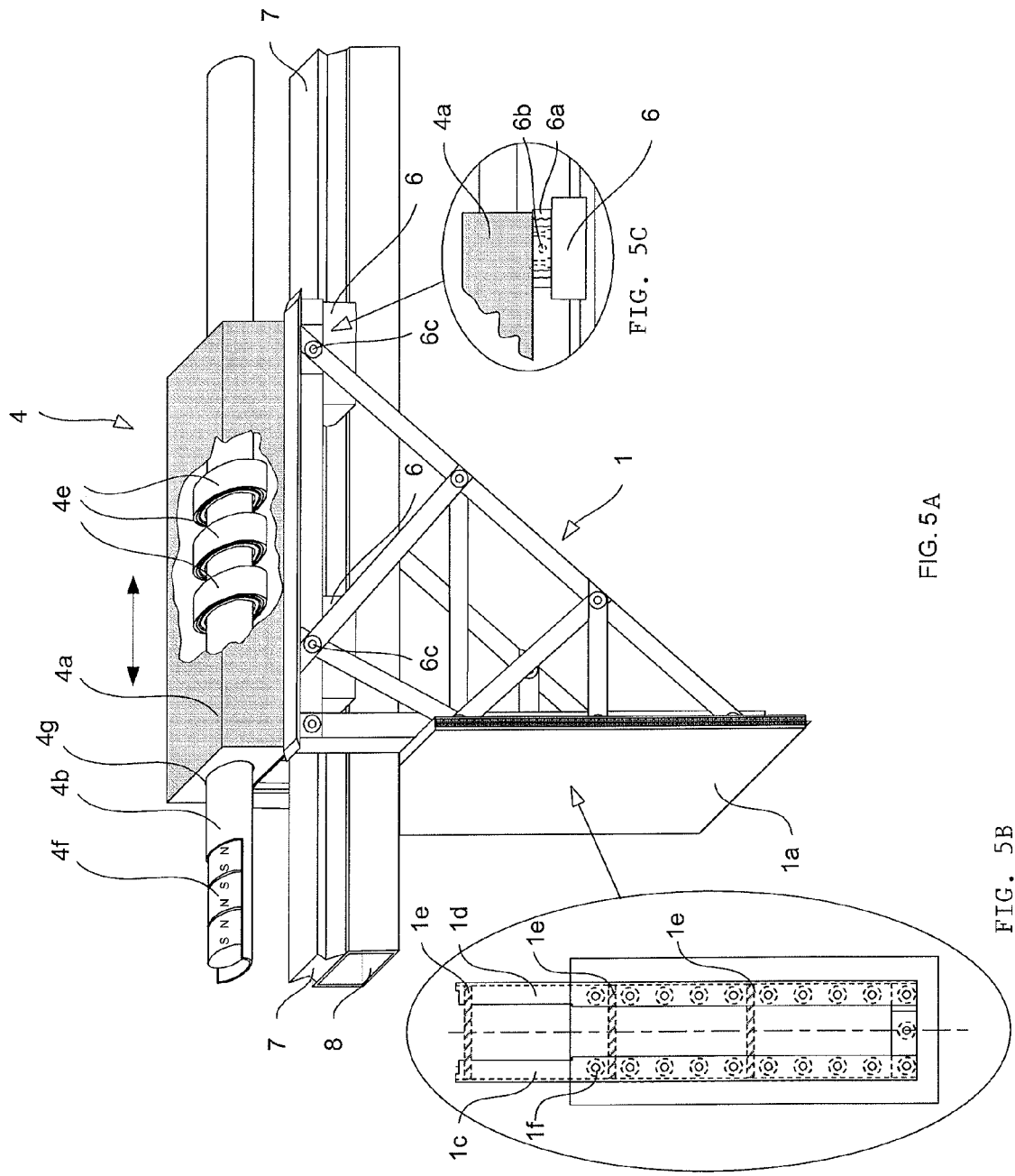

REMOVABLE WAVEMAKER

This U.S. Patent Application claims the priority filing benefit of U.S. Provisional Application 61/860,894 filed on Jul. 31, 2013, of the same title.

FIELD OF INVENTION

The subject matter disclosed herein relates to general wavemaker devices for small wave tanks or aquariums. The entire wavemaker assembly is easily removable, facilitating the wave tank to be used for other multiple non-wave generating purposes or allowing easy access for cleaning of the aquarium. In particular, it is directed to a removable wavemaker that is driven by a linear motor to generate water waves in a wave tank by the back and forth motion of a vertically-oriented wave board or wedge.

BACKGROUND OF INVENTION

Various types of wavemaker devices are known in the prior art. FIGS. 1A-1C illustrate the general concepts of the piston-type, flap-type, or plunger-type wavemakers, respectively, that can generate water waves W of varying amplitude and/or period in a wave tank. In FIG. 1A, piston P action applies a varying force to a vertical wave-board WV, driving it back and forth (indicated by opposite arrows) to generate waves W. In FIG. 1B, piston P action applies force to a pivotable flap wave-board WF to generate waves W. In FIG. 1C, piston P action applies force to a wedge WW, driving it vertically up and down to generate waves W.

The following equations are generally known for comparing the wave height (H) versus stroke length ($S_0$) for first-order piston-type and flap-type wavemakers. The plunger-type equation is not shown as it uses a more involved derivation. Variables in the equations are water depth (h) and wavelength ($\lambda$) where ($k=2\pi/\lambda$). These equations are described in *Physical Models and Laboratory Techniques in Coastal Engineering* by S. A. Hughes (1993), Volume 7, Advanced Series on Ocean Engineering, World Scientific Publishing Co. Pte. Ltd.

First-Order Piston-Type Wavemaker:

$$\frac{H}{S_0} = \frac{4\sinh^2 kh}{\sinh 2kh + 2kh}$$

First-Order Flap-Type Wavemaker:

$$\frac{H}{S_0} = \frac{4\sinh kh}{\sinh 2kh + 2kh}\left[\sinh kh + \frac{(1-\cos kh)}{kh}\right]$$

Driving a wave-board, flap or wedge may be accomplished through a hydraulically driven piston or by a rotary electric motor coupled to a linear actuator that converts rotary action into linear reciprocating motion. Hydraulically driven systems are often more complex requiring an external hydraulic pump. Other wavemakers may generate waves by pneumatic means, such as those described in U.S. Pat. No. 4,467,483 and U.S. Pat. No. 4,812,077 and U.S. Published Application 2009/0038067, or pulsing of water flow, as described in U.S. Pat. No. 5,782,204 for aquariums or reef tanks.

A plunger-type wavemaker using a linkage to a rotary electric motor is described in U.S. Pat. No. 4,507,018 and U.S. Pat. No. 4,705,428. Generating waves with a plunger-type generator using a rotating arm is shown in U.S. Pat. No. 3,973,405. A rotary electric motor used with a flap-type wavemaker is shown in U.S. Pat. No. 2,663,092, and a hydraulically driven flap-type wavemaker is shown in U.S. Pat. No. 4,976,570 and U.S. Pat. No. 4,062,192.

For piston-type rotary electric motor-driven wavemakers, waves may be generated by the movement of a partially submerged vertical wave board, which is linked to a nut that traverses back and forth by means of a motor-driven lead screw or ball screw linear actuator, as shown in U.S. Pat. No. 4,406,162. For a motor-driven ball screw linear actuator, the range of possible wave heights and wave lengths that can be generated for a certain water depth is limited by the distance the wave board can travel (stroke length) as well as its speed of travel. As the length of the ball screw increases (stroke length), ball screws reach a critical speed where the added stroke length can cause the lead screw to oscillate or whip between bearing supports, increasing the risk of lateral buckling. At higher speeds, the operation of the ball screw and gearbox can be noisy. As the screw is often placed over the water tank, lubrication of oil or grease applied to the screw to reduce mechanical wear and tear has the propensity to drip and thereby contaminate the water below.

When the wave board is required to move a greater volume of water at deeper water depths and/or travel at a faster rate of speed, loading of the motor increases. To ensure that the motor speed does not decrease under load, so that the correct wave profile is generated, a position sensor and/or a speed sensor, is often used. For many wavemakers, the sensors are mounted at the end of the motor, which extends the overall length of the wavemaker. As the wave board oscillates back and forth, a loss of position accuracy can result from wavemakers that experience gear lash from either the gearbox and/or from the screw.

Wave absorbers made of foam, expanded metal, etc. are used to dampen waves from the wavemaker. Adaptive control can be implemented to allow the wavemaker to cancel out reflected waves that come in contact with the wave board, which would otherwise interfere and thereby distort the wave profile being generated by the wavemaker. U.S. Pat. No. 4,406,162 describes active control for a wavemaker using a liquid level sensor to control the position of the wave board so that the wavemaker cancels reflective waves. Forced-feedback control can also be used with wavemakers to dampen reflective waves. For less expensive wavemakers that do not have this more complex control, the wavemaker can be shut off before the reflective wave reaches the wave board; otherwise, the wave being generated will be corrupted as it will contain this reflective component.

Removal of a wavemaker from a wave tank may be required when the wave tank is to be used for other purposes, such as experiments involving the circulation of water within the tank, etc. If a wavemaker is not self-supporting due to a complex inter-relationship of mechanical parts of the types previously described, the wavemaker would have to be unbolted and disassembled from the tank to remove it and a separate mounting structure would be required for storing the wavemaker. Removal of hydraulic systems is more involved. The repeated disconnection of hoses increases the likelihood of hydraulic fluid leaks over time. Less complex rotary electric motor-driven wavemakers are often utilized in small wave tanks. Therefore, it would be desirable to have a removable wavemaker whose structure is entirely self-supporting so that it can be removed from and installed on a wave tank easily and conveniently.

SUMMARY OF INVENTION

A removable wavemaker having a self-supporting structure for use in a wave tank comprises:

an integrated mounting structure for the removable wavemaker adapted to be mounted onto a frame forming an open top of the wave tank, a linear motor disposed above a waterline in the wave tank and mounted to an upper part of the integrated mounting structure, and having a horizontally-oriented forcer containing activation coils that is driven in reciprocation motion by electromagnetic interaction with a magnetic field generated by an array of permanent magnets contained in a tubular support structure on which the forcer is configured to slide in reciprocation motion, a movable, vertically-oriented wave board mounted on a lower part of the integrated mounting structure which extends below the waterline in the wave tank for generating waves within the wave tank by back and forth horizontal reciprocation movement of the wave board, wherein the forcer of the linear motor is supported on a movable carriage that rides on a rail fixed to the integrated mounting structure and is coupled to the wave board mounted on the lower part of the integrated mounting structure extending below the waterline for converting the back and forth horizontal reciprocation motion of the forcer into back and forth horizontal reciprocation movement of the wave board to generate waves within the wave tank.

Due to the simplicity of its self-supporting design, the described wavemaker can be easily inserted and removed from a wave tank. The self-supporting structure allows for quick alignment of the wave board with respect to the wave tank walls. Electrical connections or disconnections are easily made using electrical disconnect plugs. The wave board is directly driven by the linear motor as both are mounted on the movable integrated structure; this has the advantage of mechanical simplicity, a longer stroke length and faster speed of travel than with a linear actuator such as a ball screw. Mechanical wear and tear is significantly reduced since the linear motor's field coil (forcer) is not in direct contact with the magnetic bar around which it moves; only the supporting plastic bearings of the carriage experience contact forces. This results in very quiet back and forth movement of the wave board. No grease or oil is needed to lubricate the device, eliminating potential contamination of the water.

The simplicity of design of the preferred embodiment of the wavemaker also provides significant operational advantages. The entire motor assembly operates without forced air or water cooling and can be designed for wash down applications, which is an advantage in a wet operating environment. A position sensor mounted at the forcer, results in accurate positioning of the wave board, while eliminating gear or screw backlash and minimizes the overall length of the wavemaker's assembly. The wavemaker can be started and stopped either locally at the computer's keyboard or remotely through wireless control, freeing the operator to be at the location undergoing wave interaction.

Other objects, features, and advantages of the present invention will be explained in the following detailed description of a preferred embodiment with reference to the appended drawings.

BRIEF DESCRIPTION OF DRAWINGS

FIG. 5A shows a detailed sectional view of the removable wavemaker, with inset FIG. 5B showing the linear motor and inset FIG. 5C showing the coupling to the wave board for the removable piston-type wavemaker.

DETAILED DESCRIPTION OF PREFERRED EMBODIMENT

In the following detailed description of the subject matter hereof, a preferred embodiment is illustrated with certain specific details of implementation. However, it will be recognized by one skilled in the art that many other variations and modifications may be made and/or practiced in analogous applications or environments. It should be noted that methods, procedures, components, or functions that are commonly known to persons of ordinary skill in the field of the invention are not described in detail herein so as avoid unnecessarily obscuring a concise description of the preferred embodiment.

Figure 1A:
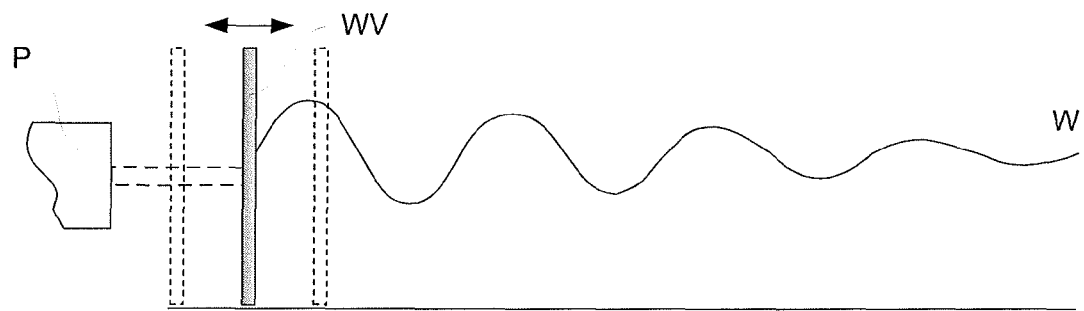
FIG. 1A shows a generalized wavemaker concept for a piston-type wavemaker, FIG. 1B for a flap-type wavemaker, and FIG. 1C for a plunger-type wavemaker.
Figure 1B:
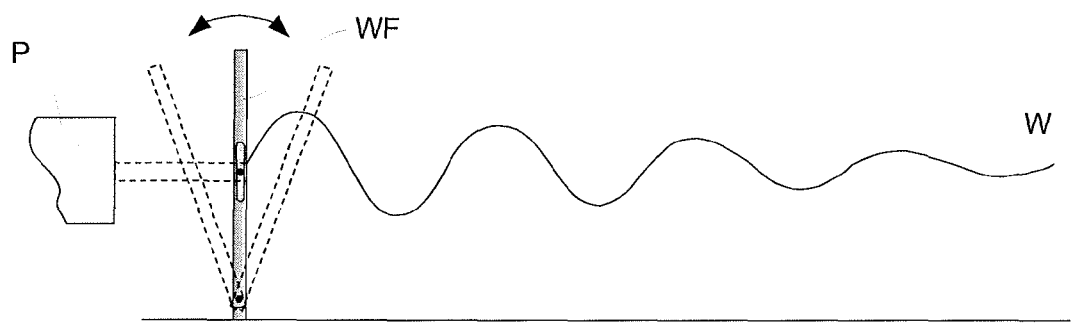
Figure 1C:
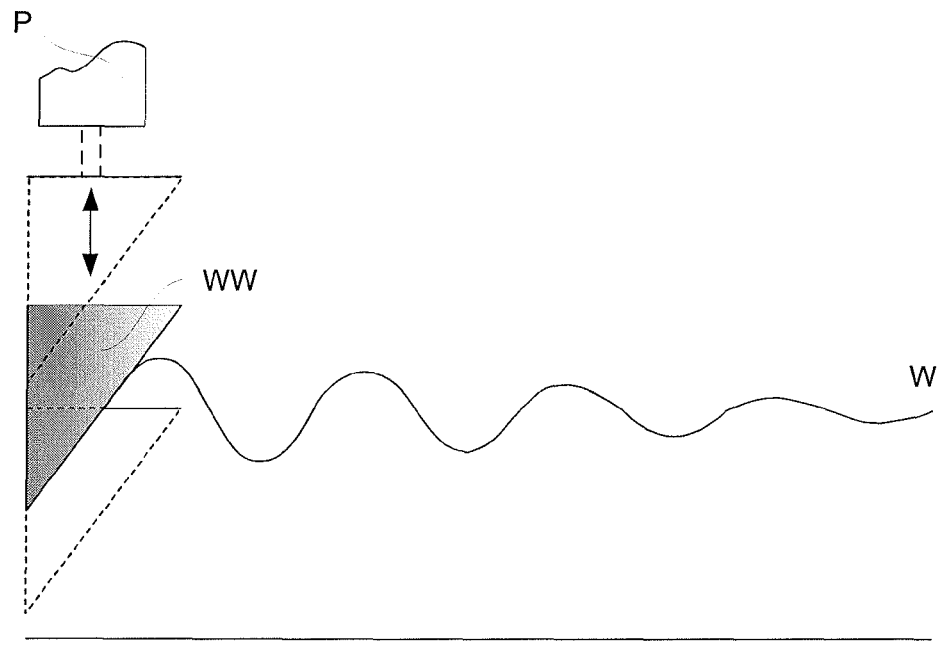
Figure 2:
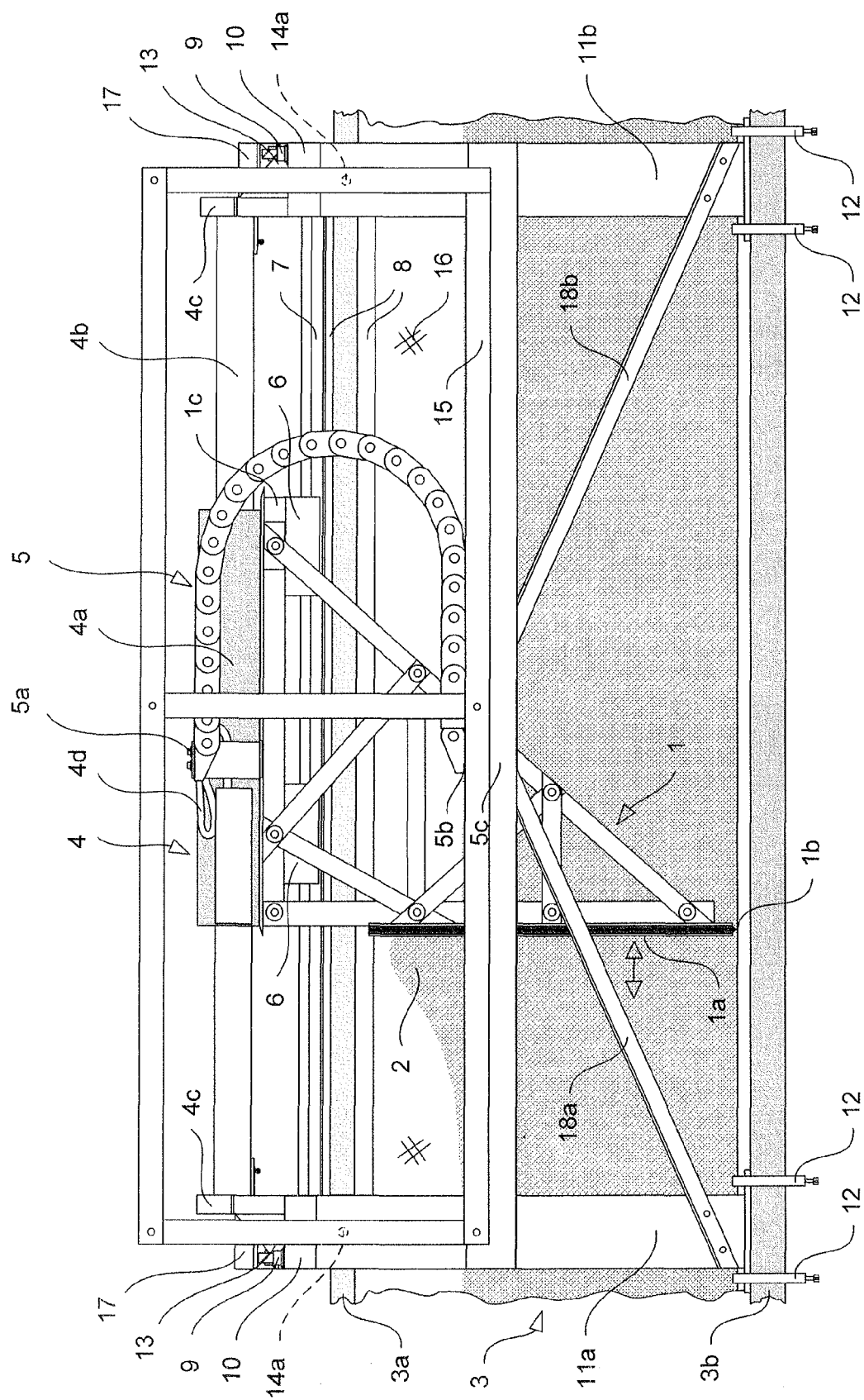
FIG. 2 shows a side view of a preferred embodiment of a removable wavemaker configured as a piston-type wavemaker for use in a wave tank.
Figure 3:
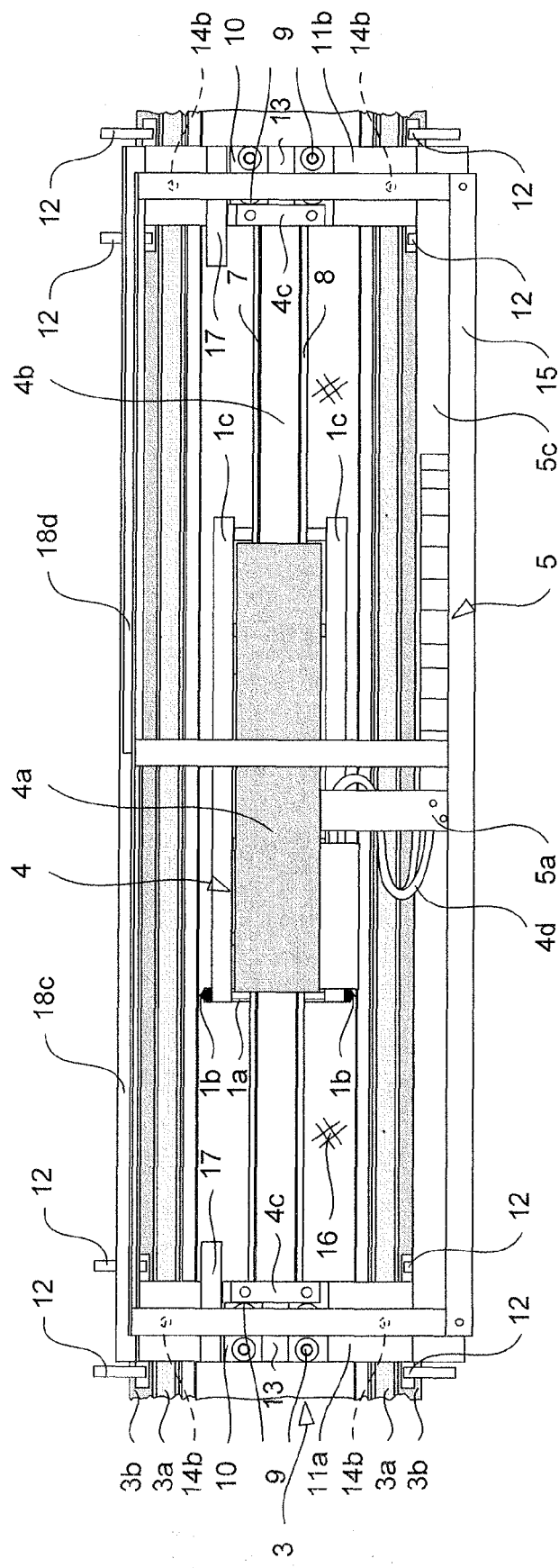
FIG. 3 shows a top view of a self-supporting mounting structure for the removable piston-type wavemaker.

FIG. 2 and FIG. 3 show side and top views of a preferred embodiment of a removable wavemaker having a self-supporting and mechanically simple structure for use in a wave tank. A movable vertically oriented wave board 1a is mounted on a lower part of the movable integrated mounting structure 1 extending below the waterline of a wave tank 3 for back and forth horizontal movement to generate waves 2 within the wave tank 3. A linear motor 4, is mounted to an upper part of the movable integrated structure 1 above the waterline and supplies a horizontal reciprocating force to the wave board 1a also mounted on the movable integrated structure to drive the wave board in a back-and-forth horizontal direction (indicated by opposite arrows). The movable integrated structure 1 rests on two carriages 6 that move along a rail 7 mounted to the fixed square tubular support 8, which is mounted to the wave tank 3.

Power applied to a field coil (forcer) 4a of the linear motor 4 generates an electromagnetic field creating an electromagnetic force relative to permanent magnets contained within a tubular stainless steel bar enclosure 4b of the linear motor 4. This propels the forcer 4a in either direction along the tubular bar enclosure 4b. Compared to a rotary electric motor that has magnetic pole faces aligned in a circular configuration, a linear motor has its magnetic field aligned in a straight line. As the forcer is separated by an air gap from the tubular magnetic enclosure, wear and tear of these parts does not occur like that of a ball screw mechanism of a piston-type rotary electric motor-driven wavemaker. Very high speeds are achievable, as it does not experience the whipping action of a lead screw. Instead, the linear motor can operate smoothly and quietly, with the travel distance dependent upon the length of the tubular bar enclosure. The linear motor may be designed to be washed down, which is an advantage in a wet operating environment. Within the linear motor's forcer 4a, a Hall effect sensor can be utilized to provide high position accuracy feedback, as it is located near the center of mass, not experiencing gear backlash present with a screw or gear-driven mechanical parts. Both ends of the tubular bar enclosure 4b are held into position with clamping blocks 4C (also see FIG. 4) and braced by triangular supports 13.

The wave board 1a is connected to the linear motor 4 by means of a movable integrated structure 1 made of metal. To ensure that buckling does not occur under load, the thickness of the supporting braces can be determined with a finite element program. The movable integrated structure 1 is bolted to a top plate that rests on two moveable carriages 6, which slide on a rail 7 that is mounted and shimmed onto a fixed stainless steel square tubular support 8. The stainless steel tubular support 8 provides a flat mounting surface for the rail, providing high rigidity so that the air gap clearance of the forcer 4 and the tubular bar enclosure 4b is maintained over the length of travel. Located within the shuttles are plastic bearings, such as those built by Igus® Inc., East Providence, R.I., requiring no lubricating grease or oil, which might otherwise enter the water of the tank or cause wiping of bearing surfaces. Around the sides and bottom perimeter of the wave board 1a are rubber wiper blades 1b that obstruct water seepage from moving past the oscillating wave board.

Figure 4:
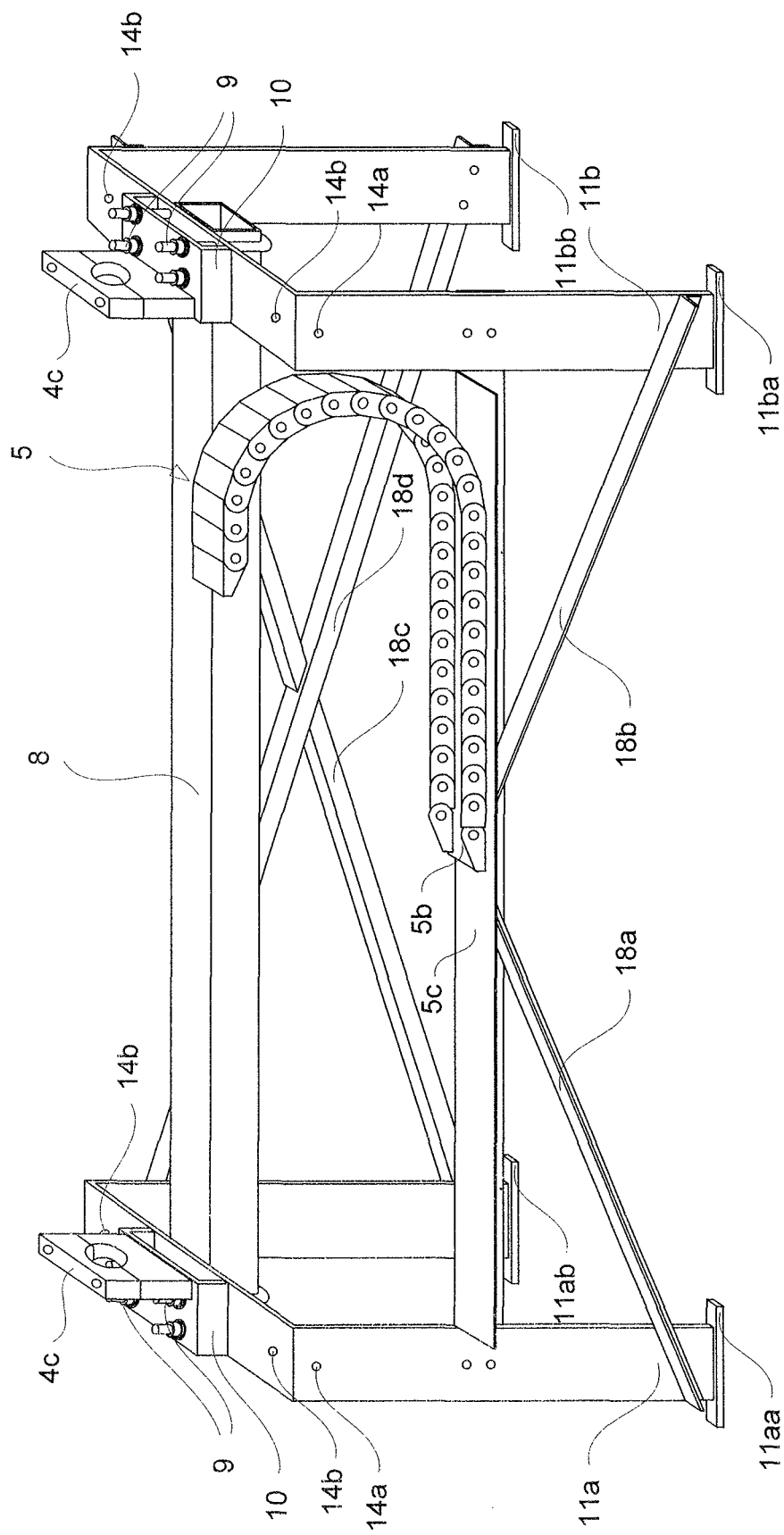
FIG. 4 shows a perspective view of the inner supporting structure of the removable piston-type wavemaker.

The square tubular support 8 is positioned near the top and center of an open, top frame 3a of the wave tank, and is supported by four U-bolts 9, two of which are inserted through each supporting leg 11a and 11b (see also FIG. 4). The supporting legs 11a and 11b are held into place with C-clamps 12, which are secured to the base 3b of the wave tank. The cables to the linear motor 4d are mounted in a plastic cable tray 5 such as built by Igus® Inc. (or made of metal) that supports the position of the cables as they flex when the linear motor moves back and forth. This cable tray 5 is connected on one end to a support 5a mounted on the linear motor and the other end of the cable tray 5b is bolted to the angle support brace 5c. With movement of the linear motor, the cable tray is either taken up or laid along angle support brace 5c. This support brace 5c is positioned low enough on the side of the wave tank to keep the bending radius of the cable as large as possible, thereby minimizing flexing of the cable to extend its longevity. The electrical wiring to the wavemaker consists of linear motor power cables, position signal wires and wiring from end-of-travel limit switch connections.

Shown in FIG. 4 is the design of the supporting structure that facilitates the insertion or removal of the wavemaker from the wave tank (FIG. 2-3 shows more detail). The self-supporting assembly comprises the two main support legs 11a and 11b, which straddle the wave tank. Each support leg has two welded feet 11aa, 11ab, 11ba, and 11bb. No drilling into the tank structure is required as the support legs are simply clamped into place (FIGS. 2 and 3) to the base 3b of the wave tank by clamps 12. Each of the support legs 11a and 11b are held into position by a square stainless steel square tubular support 8, which is clamped into position by four U-bolts 9 and braced by four cross arm braces 18a, 18b, 18c, and 18d. The side of the wavemaker's wave board is easily aligned relative to the tank walls by four side set screws 14a. Four other top set screws 14b fix the support legs 11a and 11b to the top frame 3a of the wave tank (FIGS. 2 and 3). As shown in FIGS. 2 and 3, the two carriages 6 of the linear motor 4 ride on rails 7 that are shimmed to the stainless steel square tubular support 8, the gap is fixed between the forcer 4a and the tubular bar enclosure 4b. The alignment of the gap is therefore not disturbed with removal and insertion of the wavemaker from the wave tank. Metal blocks are inserted under the metal clamping plate 10 to further strengthen the assembly when the U-bolts 9 are tightened down. When lifting the wavemaker from the wave tank, poles can be inserted under the support legs 11a and 11b to further ensure that no misalignment of the gap occurs during movement of the wavemaker. For smaller wavemakers, the poles can be used by two persons to carry the wavemaker to its storage position.

The linear motor depends on electromagnetic and magnetic interaction to generate forces, which have less mechanical advantage as compared to a rotary electric motor-driven linear actuator. If more force is needed than what one linear motor can generate, linear motors can be placed in series on the same magnetic bar or in parallel, while following one position sensor. For larger tank widths, the support legs 11a and 11b can be increased in width and four instead of two carriages can be applied. Directional wavemakers can be constructed by using multiple wavemakers together in a wave tank.

As shown in FIG. 2, the design incorporates safety features such as a protective cage 15 with an acrylic window 16, keeping moving parts enclosed, while allowing the operation to be fully visible. Travel distance of the wave board 1a is bounded by both inner software limits as well as outer hardware limit switches. Inner software travel limits prevent starting of the wavemaker should the data entered by the keyboard data result in a calculated travel distance that is beyond the limits of the wavemaker. A warning is issued if this occurs. In FIG. 3, on extreme travel of the forcer 4a, the mechanical watertight end-of-travel limit switches 17 are activated by either end of the support brace 1c, disabling the regulator and stopping the wavemaker.

FIG. 5 shows a detailed sectional view of the mounting of the linear motor 4 and wave board 1a to the movable structure 1. A graphic representation is shown of inner coils 4e within the forcer 4a and the inner array 4f of permanent magnets within the tubular bar enclosure 4b. An air gap 4g is maintained around the tubular bar enclosure 4b and the forcer 4a. Threaded screws hold the mounting block 6a (enlarged view) firmly in place between the forcer 4a and the two carriages 6. The movable structure 1 is connected on either side of the mounting block 6a by way of two bolts 6c that passes through the movable structure's braces and holes 6b (enlarged view), which are completely through the metal mounting block 6a. The wave board 1a is mounted to the movable structure by way of two angular braces 1c and 1d (enlarged view). These braces are separated from one another by tubular metal inserts 1e that are slid over threaded rods and tightened in place with nuts placed on either end of the braces. So that the wave-generating end of the wave board is kept as smooth as possible, the wave board on the other side is held in place with threaded inserts 1f that pass through the braces, while not passing completely through the wave board.

The linear motor of the type used in the preferred embodiment has a forcer containing coils wound as three phase windings that are movable in reciprocation along a smooth tubular bar enclosure made up of an array of permanent magnets that may be made of rare earth-iron-boron(NIB). Electrical current is typically applied to 3-phase coils of the forcer from a PWM (Pulse Width Modulated) servo drive or amplifier. Propulsion of the forcer results from the interaction of the electromagnetic flux of the coils with that of the field of the permanent magnets. Tubular bar linear motors are commercially available, such as those offered by Copley Motion Systems LLC, Basildon, United Kingdom. In this disclosure a tubular bar type linear motor is interchangeably referred to as a linear motor.

On power up, for a wavemaker without an absolute position encoder, home position can be determined by moving the wavemaker to the position of either of the hardware limit switches. Stopping of the wavemaker can be done in two ways: through software using the keyboard or through hardware emergency-stop, that fast stops the software regulator and also opens a contactor disconnecting power to the inverter in case the microprocessor should freeze for any reason. As a strong magnetic field is present from the rare earth magnet that is part of the linear motor, metal objects and devices such as pacemakers should be kept well away. The wave tank, linear motor, and controls are grounded. Ground fault protection is provided on the incoming power. The cable tray is provided to support and position the power and signal cables connected to the forcer.

The servo drive, such as one from Copley Motion Systems LLC, as well as other components such as electrical contactors etc., are placed within a waterproof control box. Placing the position regulator within the inverter control, rather than in an external computer software interface, insures that external feedback delays are not introduced. For maintenance purposes, this arrangement also facilitates testing as signals can be directly entered into the inverter without the external computer being connected.

One configuration for controlling the position of the linear motor is as follows: a position reference signal is sent to a linear motor's servo drive. The servo drive, consisting of a servo controller and amplifier, regulates the current to the forcer's coils according to feedback loops of position, velocity and current. For the desired wave profile to be generated in the wave tank, the reference signal is determined by a computer program according to parameters entered by the keyboard or external file. Computer software such as LabVIEW™ can be programmed to calculate the required reference signal to be sent to the servo controller. The equations previously shown can be used to calculate the stroke length of the linear motor.

The wavemaker can be operated locally from the keyboard, or controlled remotely. Making the control a wireless operation facilitates ease of operation, by allowing the researcher or instructor to start or stop the wavemaker at any location along the tank, especially when near the object of study undergoing wave interaction.

If adaptive control is not present, a countdown timer can be added. The countdown time is active when the wavemaker is started. Its countdown time is set to turn off the wavemaker just before the reflected wave from the object under test reaches the wave board.

In the preferred embodiment described above, the waveboard and linear motor is configured as a piston-type wavemaker. The waveboard and linear motor could equivalently be modified and configured for a flap-type or plunger-type wavemaker.

In summary, a removable wavemaker is provided whose structure is entirely self-supporting so that the entire assembly can be removed as one unit by merely loosening clamps on the wave tank and re-installed and aligned easily and conveniently. Primarily applicable for small wave tanks, the described wavemaker can be easily inserted or removed from a wave tank or aquarium. Operating without gears or screws, the wavemaker is very quiet; it is relatively maintenance free, being devoid of grease and oil. A wide range of wave amplitudes and wave periods can be generated by either entering the desired wave parameters locally from a keyboard, from a computer file or from an externally generated signal. The wavemaker can be started and stopped either locally at the computer's keyboard or remotely through wireless control, freeing the operator to be near the object undergoing wave interaction.

Many modifications and variations may of course be devised given the above description of preferred embodiments for implementing the principles in the present disclosure. It is intended that all such modifications and variations be considered as within the spirit and scope of this disclosure, as defined in the following claims.

The invention claimed is:

1. A removable wavemaker having a self-supporting structure for use in combination with a wave tank comprising:

a wave tank for holding a volume of water therein on which waves are to be generated on a surface of the water, an integrated mounting structure for the removable wavemaker adapted to be mounted onto a frame forming an open top of the wave tank, a linear motor disposed above a waterline in the wave tank and mounted to an upper part of the integrated mounting structure, and having a horizontally-oriented forcer containing activation coils that is driven in reciprocation motion by electromagnetic interaction with a magnetic field generated by an array of permanent magnets contained in a tubular support structure on which the forcer is configured to slide in reciprocation motion, a movable, vertically-oriented wave board mounted on a lower part of the integrated mounting structure which extends below the waterline in the wave tank for generating waves within the wave tank by back and forth horizontal reciprocation movement of the wave board, wherein the forcer of the linear motor is supported on a movable carriage that rides on a rail fixed to the integrated mounting structure and is coupled to a piston member for the wave board mounted on the lower part of the integrated mounting structure extending below the waterline for converting the back and forth horizontal reciprocation motion of the forcer into back and forth horizontal reciprocation movement of the wave board to generate waves within the wave tank.

2. The removable wavemaker according to claim 1, wherein the linear motor has the array of permanent magnets arranged in a straight line in the horizontal direction.

3. The removable wavemaker according to claim 1, wherein the forcer is separated by an air gap from the tubular support structure.

4. The removable wavemaker according to claim 1, wherein the upper part of the integrated structure is coupled to a top plate that rests on two moveable carriages which slide on a two-sided rail.

5. The removable wavemaker according to claim 1, wherein cables electrically connected to the linear motor are carried in a flexible cable tray that supports the cables as they flex when the forcer moves back and forth.

6. The removable wavemaker according to claim 1, wherein the integrated mounting structure for facilitating insertion and removal of the wavemaker from the wave tank comprises two main support legs that straddle the frame of the open top of the wave tank and having lower ends that are clamped into place to a base of the wave tank.

7. The removable wavemaker according to claim 1, wherein a given travel distance of the wave board is defined by outer hardware limit switches for the movement of the forcer.

8. The removable wavemaker according to claim 1, wherein the wave board is mounted to the lower part of the integrated mounting structure by angular braces separated from one another by inserts that are slid over threaded rods fastened to respective ends of the braces.

9. The removable wavemaker according to claim 1, wherein the integrated mounting structure is configured to enable alignment of the wave board with respect to the wave tank walls.

10. The removable wavemaker according to claim 1, wherein the linear motor is operated without forced air or water cooling.

11. The removable wavemaker according to claim 1, wherein the coils of the forcer are wound as three-phase windings for movement with respect to the array of permanent magnets arranged in series in a straight line.

12. The removable wavemaker according to claim 11, wherein the permanent magnets are made of rare earth-iron-boron (NIB).

13. The removable wavemaker according to claim 11, wherein electrical current is applied to the three-phase coils of the forcer from a Pulse Width Modulated (PWM) servo drive or amplifier.

14. A removable wavemaker employing a linear motor for generating waves in a wave tank comprising:
- a linearly-oriented forcer containing activation coils that is driven in reciprocation motion in a linear direction by electromagnetic interaction with a magnetic field generated by an array of permanent magnets carried in a tubular bar structure;
- a tubular bar structure containing the array of permanent magnets on which the forcer is configured to slide in reciprocation motion when activated by electrical current provided to its activation coils; and
- a coupling for the forcer to an output member to be driven in reciprocation movement by the forcer,
- wherein the array of permanent magnets is arranged in a straight line in the tubular bar structure for driving the forcer in reciprocation in the linear direction.

15. The removable wavemaker according to claim 14, wherein the forcer is separated by an air gap from the tubular bar structure.

16. The removable wavemaker according to claim 14, wherein a given travel distance of the output member is defined by outer hardware limit switches for the movement of the forcer.

17. The removable wavemaker according to claim 14, wherein the coils of the forcer are wound as three-phase windings for movement with respect to the array of permanent magnets arranged in series in a straight line.

18. The removable wavemaker according to claim 17, wherein the permanent magnets are made of rare earth-iron-boron (NIB).

19. The removable wavemaker according to claim 17, wherein electrical current is applied to the three-phase coils of the forcer from a Pulse Width Modulated (PWM) servo drive or amplifier.

20. The removable wavemaker according to claim 14, wherein the linear motor is operated without forced air or water cooling.

\* \* \* \* \*